United States Patent
Bouazizi et al.

(10) Patent No.: US 12,003,693 B2
(45) Date of Patent: *Jun. 4, 2024

(54) OBJECT COLLISION DATA FOR VIRTUAL CAMERA IN VIRTUAL INTERACTIVE SCENE DEFINED BY STREAMED MEDIA DATA

(71) Applicant: QUALCOMM Incorporated, San Diego, CA (US)

(72) Inventors: Imed Bouazizi, Frisco, TX (US); Thomas Stockhammer, Bergen (DE)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,023

(22) Filed: Mar. 8, 2022

(65) Prior Publication Data

US 2022/0292770 A1    Sep. 15, 2022

Related U.S. Application Data

(60) Provisional application No. 63/159,379, filed on Mar. 10, 2021.

(51) Int. Cl.
*G06T 13/40* (2011.01)
*G06T 17/10* (2006.01)
(Continued)

(52) U.S. Cl.
CPC .......... *H04N 13/178* (2018.05); *G06T 13/40* (2013.01); *G06T 17/10* (2013.01); *G06T 17/20* (2013.01);
(Continued)

(58) Field of Classification Search
None
See application file for complete search history.

(56) References Cited

U.S. PATENT DOCUMENTS 10,524,017 B2 * 12/2019 Westerhoff ..... H04N 21/440218
10,987,579 B1 *  4/2021 Borovikov ............. A63F 13/52
(Continued)

FOREIGN PATENT DOCUMENTS

EP           2030661 A2    3/2009

OTHER PUBLICATIONS

Gao "MPEG-V Based Web Haptic Authoring Tool", Ottawa, Canada 2014 (Year: 2014).*

(Continued)

*Primary Examiner* — Saptarshi Mazumder
(74) *Attorney, Agent, or Firm* — Shumaker & Sieffert, P.A.

(57) ABSTRACT

An example device for retrieving media data includes a memory configured to store media data; and one or more processors implemented in circuitry and configured to execute a presentation engine, the presentation engine being configured to: receive streamed media data representing a virtual three-dimensional scene including at least one virtual solid object; receive object collision data representing boundaries of the at least one virtual solid object; receive camera movement data from a user requesting that the virtual camera move through the at least one virtual solid object; and using the object collision data, prevent the virtual camera from passing through the at least one virtual solid object in response to the camera movement data.

31 Claims, 8 Drawing Sheets

(51) Int. Cl.
*G06T 17/20* (2006.01)
*H04N 5/20* (2006.01)
*H04N 5/222* (2006.01)
*H04N 13/117* (2018.01)
*H04N 13/178* (2018.01)
*H04N 13/275* (2018.01)

(52) U.S. Cl.
CPC ......... *H04N 5/2224* (2013.01); *H04N 13/117* (2018.05); *H04N 13/275* (2018.05); *G06T 2210/12* (2013.01); *G06T 2210/21* (2013.01)

(56) References Cited

U.S. PATENT DOCUMENTS

| | | | |
|---|---|---|---|
| 11,257,282 B2 * | 2/2022 | Tong | H04N 7/181 |
| 2006/0227134 A1 | 10/2006 | Khan et al. | |
| 2019/0236809 A1 | 8/2019 | Graziosi | |
| 2020/0360824 A1 * | 11/2020 | Fargo | A63F 13/87 |
| 2022/0295034 A1 | 9/2022 | Bouazizi et al. | |

OTHER PUBLICATIONS

Clark et al. "Review: A Web-Based Simulation Viewer for Sharing Evolutionary Robotics Results", GECCO '18 Companion, Jul. 15-19, 2018 (Year: 2018).*
International Search Report and Written Opinion—PCT/US2022/071056—ISA/EPO—dated May 23, 2022, 13 pp.
McCrae, J., et al., "Multiscale 3D Navigation", Interactive 3D Graphics and Games, ACM, 2 Penn Plaza, Suite 701 New York NY 10121-0701 USA, Feb. 27, 2009 (Feb. 27, 2009), XP058097806, pp. 7-14, DOI: 10.1145/1507149.1507151, ISBN: 978-1-60558-429-4.
Qualcomm Incorporated (Rapporteur)1: "FS_XR5G: Permanent Document, v0. 6.1", 3GPP Draft, 3GPP TSG SA WG-4 Meeting #105, S4-191077-XR5G-PD-V0.6.1, 3rd Generation Partnership Project (3GPP), Mobile Competence Centre, 650, Route Des Lucioles, F-06921, Sophia-Antipolis Cedex, France, vol. TSG SA, No. Ljubljana, Slovenia, Aug. 8, 2019-Aug. 12, 2019, Aug. 16, 2019 (Aug. 16, 2019), XP051760808, 78 Pages, Retrieved from the Internet: URL: http://www.3gpp_org/ftp/Meetings_3GPP_SYNC/SA4/Docs/S4-191077.zip.
Fielding R., et al., "RFC 2616: Hypertext Transfer Protocol HTTP/1.1", Network Working Group, Internet Citation, Jun. 1999 (Jun. 1999), 165 Pages, XP002196143, Retrieved from the Internet: URL: http://www.rfc-editor-org/ [retrieved on Apr. 15, 2002].
ISO/IEC DIS 23090-14:2021(E): "Information Technology—Coded Representation of Immersive Media—Part 14: Scene Description", ISO/IEC JTC 1/SC 29/WG 03, Secretariat: JISC, 2021, 91 Pages.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
Paila T., et al., "FLUTE—File Delivery Over Unidirectional Transport", FLUTE—File Delivery Over Unidirectional Transport, rfc6726. txt, Internet Engineering Task Force (IETF), Standard Track, Internet Society (ISOC) 4, Rue Des Falaises CH—1205 Geneva, Switzerland, Nov. 6, 2012 (Nov. 6, 2012), XP015086468, pp. 1-46, http://tools.ietf.org/html/rfc6726, [retrieved on Nov. 6, 2012], p. 3, line 30-p. 27, line 12.

* cited by examiner

OBJECT COLLISION DATA FOR VIRTUAL CAMERA IN VIRTUAL INTERACTIVE SCENE DEFINED BY STREAMED MEDIA DATA

This application claims the benefit of U.S. Provisional Application No. 63/159,379, filed Mar. 10, 2021, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques related to streaming interactive media data. Such interactive media data may be, for example, virtual reality, augmented reality, or other such interactive content, e.g., other three-dimensional video content. A recent MPEG Scene Description element includes support for timed media in glTF 2.0. A media access function (MAF) offers an application programming interface (API) to a presentation engine, through which the presentation engine may request timed media. A retrieval unit executing the MAF may process the retrieved timed media data and pass the processed media data to the presentation engine in a desired format through circular buffers. The current MPEG Scene Description allows users to consume scene media data in 6 degrees of freedom (6DoF). Thus, users are typically able to move freely in a 3D scene (e.g., through walls displayed in the 3D scene). However, content authors may wish to impose limits on the movement of the viewer to certain areas, e.g., to prevent movement through displayed walls or other objects. This disclosure describes techniques by which to impose such limits, which may improve a user's experience, because the experience may be made more realistic by preventing the user from passing through obstacles in a virtual world.

In one example, a method of retrieving media data includes receiving, by a presentation engine, streamed media data representing a virtual three-dimensional scene including at least one virtual solid object; receiving, by the presentation engine, camera control data for the three-dimensional scene, the camera control data including data defining restrictions to prevent a virtual camera from passing through the at least one virtual solid object; receiving, by the presentation engine, camera movement data from a user requesting that the virtual camera move through the at least one virtual solid object; and using the camera control data, preventing, by the presentation engine, the virtual camera from passing through the at least one virtual solid object in response to the camera movement data.

In another example, a device for retrieving media data includes a memory configured to store media data; and one or more processors implemented in circuitry and configured to execute a presentation engine, the presentation engine being configured to: receive streamed media data representing a virtual three-dimensional scene including at least one virtual solid object; receive camera control data for the three-dimensional scene, the camera control data including data defining restrictions to prevent a virtual camera from passing through the at least one virtual solid object; receive camera movement data from a user requesting that the virtual camera move through the at least one virtual solid object; and using the camera control data, prevent the virtual camera from passing through the at least one virtual solid object in response to the camera movement data.

In another example, a computer-readable storage medium has stored thereon instructions that, when executed, cause a processor of a client device to: receive streamed media data representing a virtual three-dimensional scene including at least one virtual solid object; receive camera control data for the three-dimensional scene, the camera control data including data defining restrictions to prevent a virtual camera from passing through the at least one virtual solid object; receive camera movement data from a user requesting that the virtual camera move through the at least one virtual solid object; and using the camera control data, prevent the virtual camera from passing through the at least one virtual solid object in response to the camera movement data.

In another example, a device for retrieving media data includes means for receiving streamed media data representing a virtual three-dimensional scene including at least one virtual solid object; means for receiving camera control data for the three-dimensional scene, the camera control data including data defining restrictions to prevent a virtual camera from passing through the at least one virtual solid object; means for receiving camera movement data from a user requesting that the virtual camera move through the at least one virtual solid object; and means for using the camera control data to prevent the virtual camera from passing through the at least one virtual solid object in response to the camera movement data.

In another example, a method of retrieving media data includes receiving, by a presentation engine, streamed media data representing a virtual three-dimensional scene including at least one virtual solid object; receiving, by the presentation engine, object collision data representing boundaries of the at least one virtual solid object; receiving, by the presentation engine, camera movement data from a user requesting that the virtual camera move through the at least one virtual solid object; and using the object collision data, preventing, by the presentation engine, the virtual camera from passing through the at least one virtual solid object in response to the camera movement data.

In another example, a device for retrieving media data includes a memory configured to store media data; and one or more processors implemented in circuitry and configured to execute a presentation engine, the presentation engine being configured to: receive streamed media data representing a virtual three-dimensional scene including at least one virtual solid object; receive object collision data representing boundaries of the at least one virtual solid object; receive camera movement data from a user requesting that the virtual camera move through the at least one virtual solid object; and using the object collision data, prevent the virtual camera from passing through the at least one virtual solid object in response to the camera movement data.

In another example, a computer-readable storage medium having stored thereon instructions that, when executed, cause a processor of a client device to: receive streamed media data representing a virtual three-dimensional scene including at least one virtual solid object; receive object collision data representing boundaries of the at least one virtual solid object; receive camera movement data from a user requesting that the virtual camera move through the at least one virtual solid object; and using the object collision data, prevent the virtual camera from passing through the at least one virtual solid object in response to the camera movement data.

In another example, a device for retrieving media data includes means for receiving streamed media data representing a virtual three-dimensional scene including at least one virtual solid object; means for receiving object collision data representing boundaries of the at least one virtual solid object; means for receiving camera movement data from a user requesting that the virtual camera move through the at least one virtual solid object; and means for using the object collision data to prevent the virtual camera from passing through the at least one virtual solid object in response to the camera movement data.

The details of one or more examples are set forth in the accompanying drawings and the description below. Other features, objects, and advantages will be apparent from the description and drawings, and from the claims.

DETAILED DESCRIPTION

Figure 1:
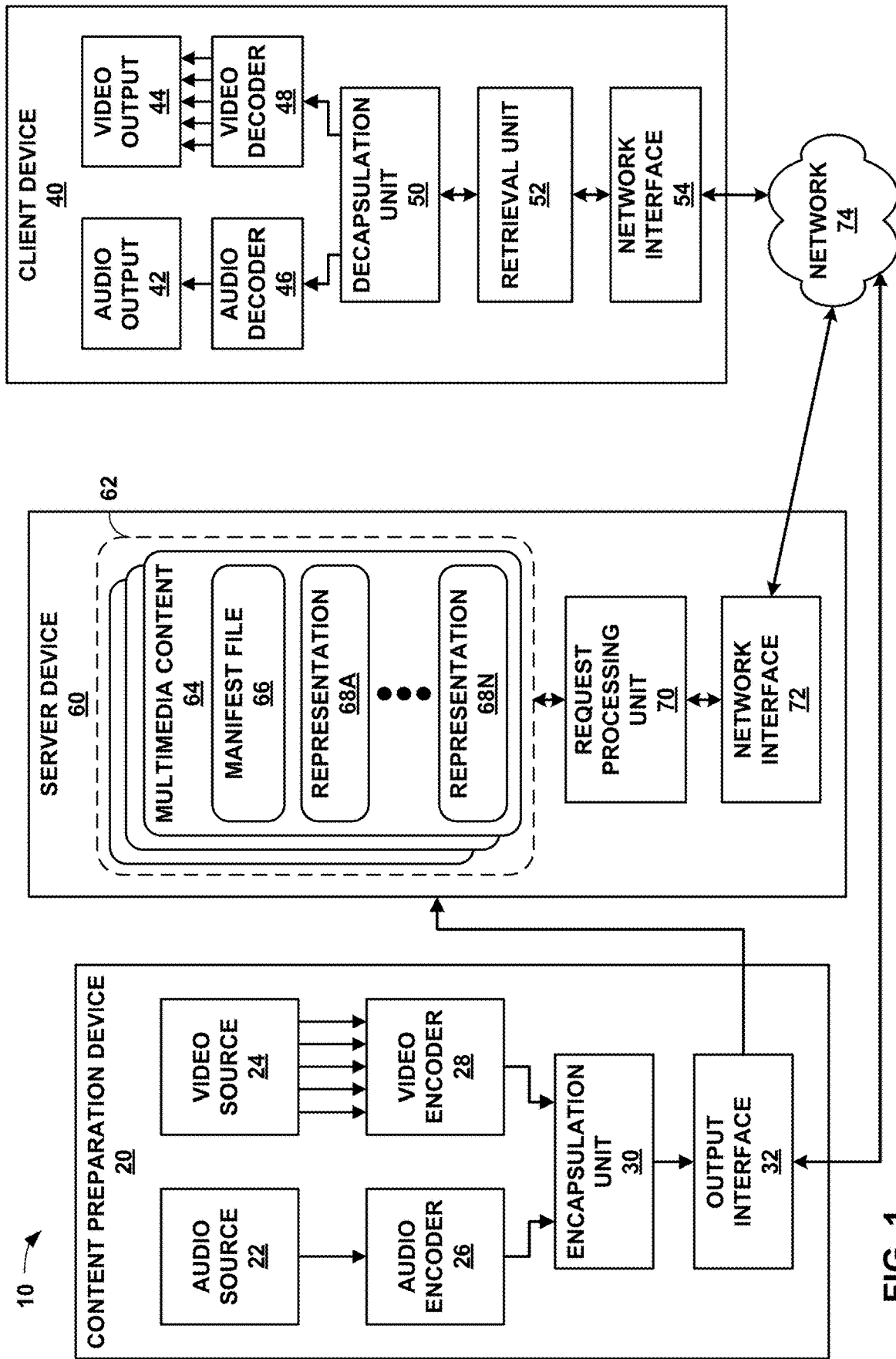
FIG. 1 is a block diagram illustrating an example system that implements techniques for streaming media data over a network.

Interactive media data may be streamed over a network. For example, a client device may retrieve the interactive media data using unicast, broadcast, multicast, or the like. The interactive media data may be, for example, three-dimensional (3D) media data, for extended reality (XR), augmented reality (AR), virtual reality (VR), or the like. Thus, when presented to a user, the user may navigate a 3D virtual scene rendered according to the interactive media data.

An MPEG Scene Description may describe a three-dimensional (3D) scene for a virtual world or experience, e.g., for XR, VR, AR, or other interactive media experiences. According to the techniques of this disclosure, the MPEG Scene Description may describe objects within the 3D scene, such as chairs, walls, tables, counters, doors, windows, or other solid objects. This disclosure describes techniques by which the MPEG Scene Description (or other such descriptive sets of data) may be enhanced to impose limitations on virtual camera movement, e.g., to prevent the camera from passing through solid objects such as walls.

In particular, a scene description may describe a set of paths along which the camera is allowed to move. The paths may be described as a set of anchor points that are connected through path segments. For enhanced expressiveness of camera control, each path segment may be enhanced with a bounding volume that allows some freedom in motion along the path.

Additionally or alternatively, a scene description may describe virtual solid objects in the scene. The scene description may provide information representing, for example, boundaries of the objects, whether the object can be affected by collisions with a user or other objects (such as whether the object moves or is to remain stationary in response to such collisions), a material for the object representing how colliding objects interact with the object, and/or animation data representing an animation to be played or applied to the object in response to a collision.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. Video output 44 may be included in a display device for extended reality, augmented reality, or virtual reality, such as a headset. Likewise, the configuration data may indicate whether video output 44 is capable of rendering 3D video data, e.g., for extended reality, augmented reality, virtual reality, or the like. The configuration data may also include any or all of a language preference selected by a user of client device 40, one or more camera perspectives corresponding to depth preferences set by the user of client device 40, and/or a rating preference selected by the user of client device 40.

Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In accordance with the techniques of this disclosure, a user of client device 40 may obtain media data related to a 3D virtual scene, such as for extended reality (XR), augmented reality (AR), virtual reality (VR), or the like. The user may navigate through the 3D virtual scene using one or more devices in communication with client device 40, such as controllers. Additionally or alternatively, client device 40 may include sensors, cameras, or the like for determining that a user has moved in real world space, and client device 40 may translate such real world movements into virtual space movements.

The 3D virtual scene may include one or more virtual solid objects. Such objects may include, for example, walls, windows, tables, chairs, or any other such object that may appear in a virtual scene. In accordance with the techniques of this disclosure, media data retrieved by retrieval unit 52 may include a scene description that describes such virtual solid objects. The scene description may conform to, e.g., an MPEG Scene Description element of glTF 2.0.

In some examples, the scene description may include a description of permissible camera movements. For example, the scene description may describe one or more bounding volumes (e.g., according to a volume of a shape, such as a sphere, cube, cone, frustrum, or the like) in which a virtual camera is permitted to move, such that the virtual camera is not permitted to move beyond the bounds of the shapes. That is, the bounding volume may describe a permissible camera movement volume in which the virtual camera is permitted to move. Additionally or alternatively, the scene description may describe one or more vertices or anchor points, as well as permitted paths (e.g., segments) between the vertices or anchor points. Client device 40 may only permit the virtual camera to move along the permitted paths and/or within the bounding volume.

In some examples, additionally or alternatively, the scene description may describe one or more virtual solid objects in the scene that the virtual camera cannot pass through.

Figure 2:
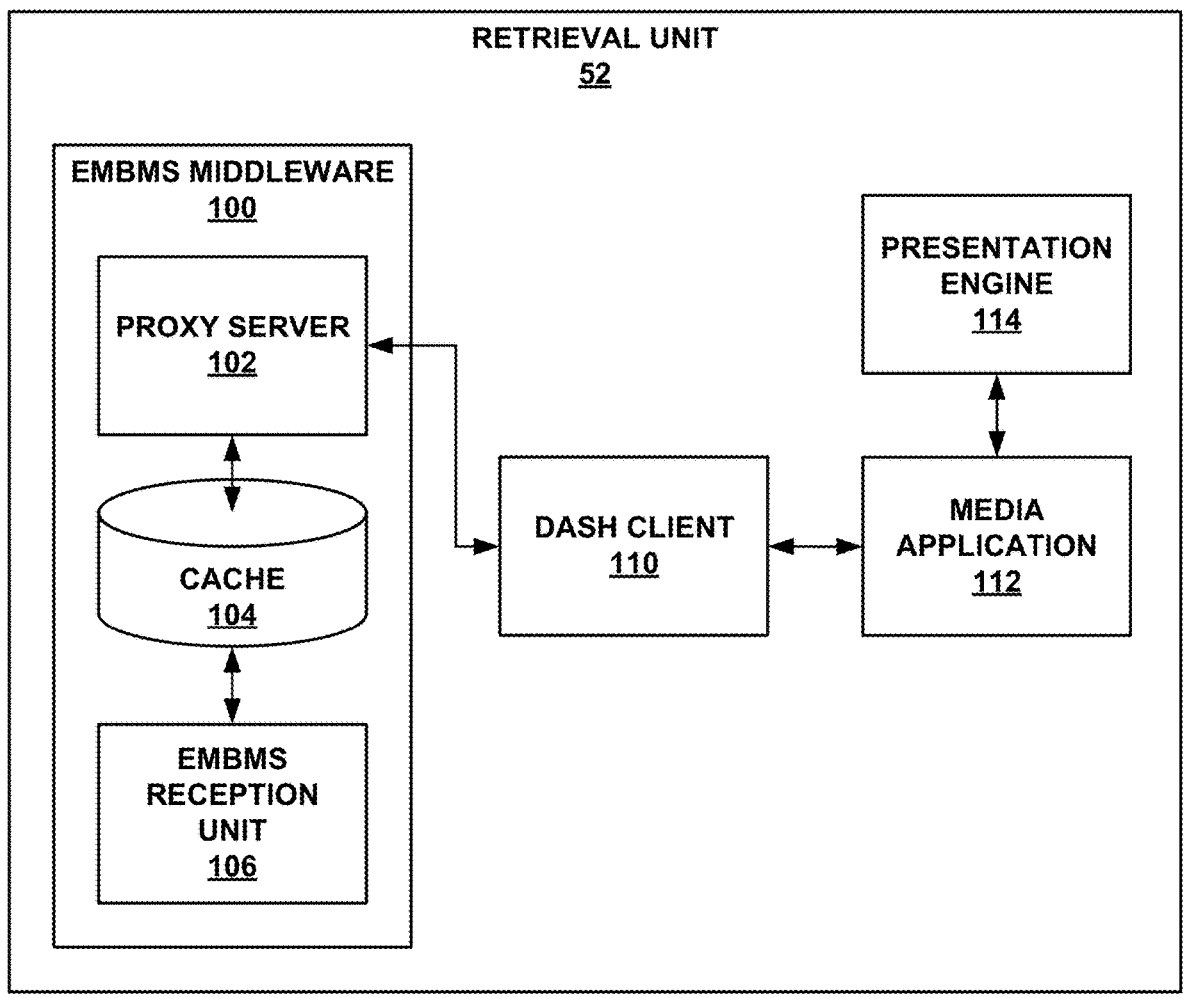
FIG. 2 is a block diagram illustrating an example set of components of a retrieval unit of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, media application 112, and presentation engine 114.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

DASH client 110 provides the retrieved media data to media application 112. Media application 112 may be, for example, a web browser, a game engine, or anther application that receives and presents media data. Furthermore, presentation engine 114 represents an application that interacts with media application 112 to present retrieved media data in a 3D virtual environment. Presentation engine 114 may, for example, map two-dimensional media data onto a 3D projection. Presentation engine 114 may also receive input from other elements of client device 40 to determine a position of a user in the 3D virtual environment and an orientation in which the user is facing in that position. For example, presentation engine 114 may determine X-, Y-, and Z-coordinates for the position of the user, as well as an orientation in which the user is looking, in order to determine appropriate media data to display to the user. Moreover, presentation engine 114 may receive camera movement data representing real-world user movement data and translate the real-world user movement data into 3D virtual space movement data.

In accordance with the techniques of this disclosure, eMBMS middleware unit 100 may receive media data (e.g., according to glTF 2.0) via broadcast or multicast, then DASH client 110 may retrieve the media data from eMBMS middleware unit 100. The media data may include a scene description including camera control information indicating how a virtual camera can move through a virtual scene. For example, the scene description may include data describing permissible paths through the virtual scene, e.g., along defined paths between anchor points. Additionally or alternatively, the scene description may include data describing a bounding volume representing a volume in which the virtual camera is permitted to move. Additionally or alternatively, the scene description may include data describing one or more solid virtual objects in the 3D virtual environment, such as walls, tables, chairs, or the like. For example, the data of the scene description may define collision boundaries of the 3D virtual object. The scene description may further include data representing what happens in the event of a collision with such an object, such as an animation to be played using the object, whether the object is static (e.g., as in the case of a wall) or dynamic (e.g., as in the case of a chair).

Presentation engine 114 may use the scene description to determine what to present in the event of a collision with a 3D virtual object and/or an attempt to move outside of a permissible path or volume. For example, if the scene description includes data for a permissible path or bounding volume and a user attempts to move beyond the permissible path or bounding volume, presentation engine 114 may simply avoid updating a display, thereby indicating that such a movement is not permitted. As another example, if the scene description includes data for a 3D virtual solid object and a user attempts to move through the 3D virtual solid object, if the 3D virtual solid object is static, presentation engine 114 may avoid updating the display. If the 3D virtual solid object is not static, presentation engine 114 may determine an animation to display for the object, e.g., translational movement and/or rotational movement to be applied to the object. For example, if the 3D virtual solid object is a chair, the animation data may indicate that the chair is to either be pushed along the floor or to fall over in the event of a collision.

Figure 3:
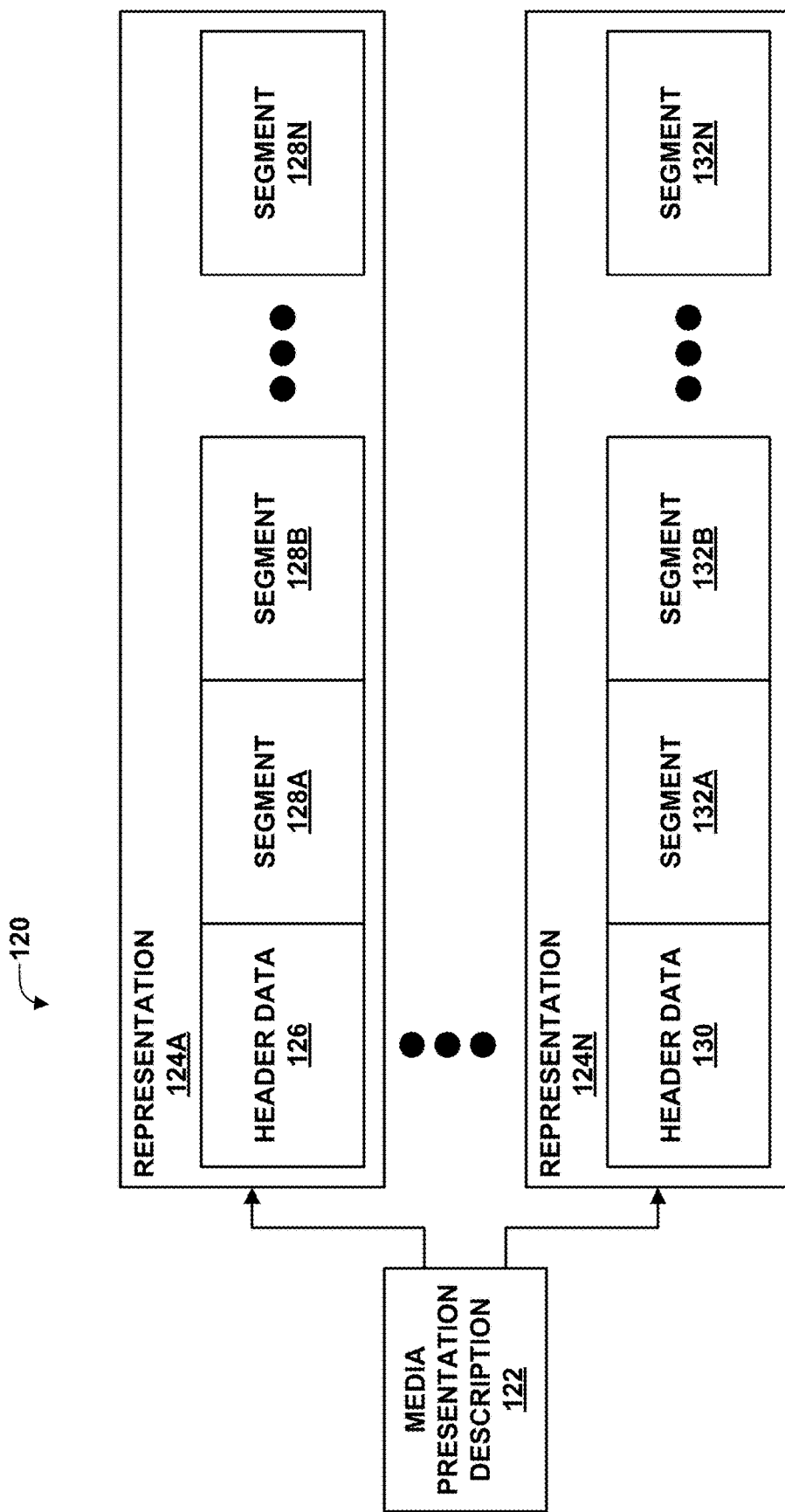
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
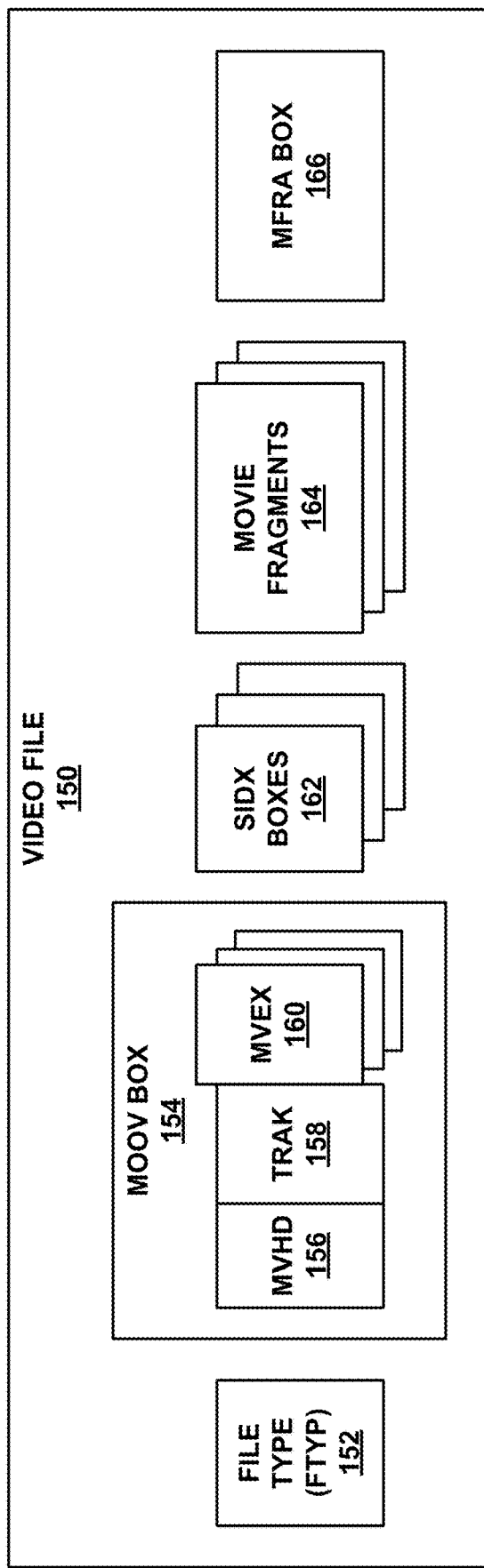
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG.

3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
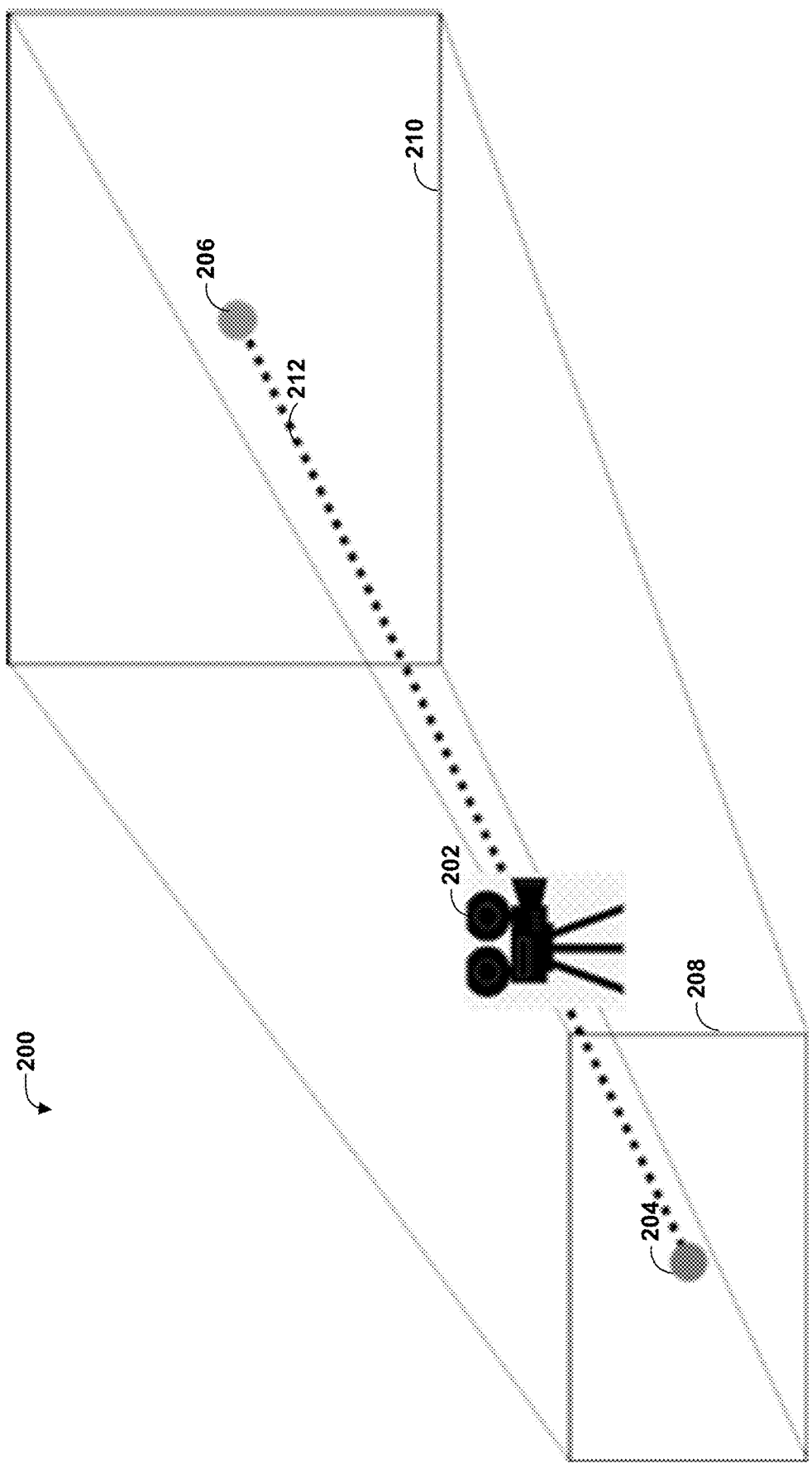
FIG. 5 is a conceptual diagram illustrating an example camera path segment with a bounding volume according to the techniques of this disclosure.

FIG. 5 is a conceptual diagram illustrating an example camera path segment 212 with a bounding volume according to the techniques of this disclosure. In particular, in 3D scene 200, camera 202 represents a viewpoint from which a user is able to view a portion of 3D scene 200. In this example, path segment 212 is defined between point 204 and point 206. Moreover, a bounding volume is defined by an extrusion of points from bounding box 208 to bounding box 210 along path segment 212. Thus, in this example, camera 202 is permitted to move within the bounding volume along path segment 212, but restricted from moving beyond the bounding volume.

A scene description may describe a set of paths along which a camera, such as camera 202, is permitted to move. The paths may be described as a set of anchor points, such as points 204, 206, that are connected by a path segment, such as path segment 212. In some examples, such as the example of FIG. 5, each path segment may be enhanced with a bounding volume that allows some freedom of motion along the path.

The scene camera, and by consequence the viewer, will be able to move freely within the bounding volume along the path segment. The path segment may be described using more complex geometric forms to allow for finer control of the path.

Furthermore, the camera parameters may be constrained at each point along the path. The parameters may be provided for every anchor point and then used together with an interpolation function to calculate the corresponding parameters for every point along the path segment. The interpolation function may apply to all parameters, including the bounding volume.

The camera control extension mechanism of this disclosure may be realized as a glTF 2.0 extension that defines camera control for a scene. The camera control extension may be identified by an "MPEG_camera_control" tag, which may be included in an extensionsUsed element, and may be included in an extensionsRequired element for a 3D scene.

An example "MPEG_camera_control" extension is shown below in Table 1, and may be defined on "camera" elements of a scene description.

TABLE 1

| Name | Type | Default | Description |
| --- | --- | --- | --- |
| anchors | number | N/A | Number of anchor points in the camera paths. |
| segments | number | N/A | Number of path segments in the camera paths. |
| boundingVolume | number | BV_NONE | The type of the bounding volume for the path segments. Possible types are: BV_NONE: no bounding volume BV_CONE: capped cone bounding volume, defined by a circle at each anchor point. BV_FRUSTUM: a frustum bounding volume, defined by two rectangles that each contains an anchor point. BV_SPHERE: a spherical bounding volume around each point along the path segment. The bounding volume is defined by the radius of the sphere. |
| intrinsicParameters | boolean | false | When set to true, indicates that the intrinsic camera parameters are modified at each anchor point. The parameters shall be provided based on the type of camera as defined in [glTF 2.0] as camera.perspective or camera.orthographic. |
| accessor | number | N/A | The index of the accessor or timed accessor that provides the camera control information. |

Camera control information may be structured as follows:
For each anchor point, (x,y,z) coordinates of the anchor points may be expressed using floating point values
For each path segment, (i,j) indices of the first and second anchor point of the path segment may be expressed as integer values
For bounding volumes:
   If boundingVolume is BV_CONE, (r1,r2) radiuses of circle of first anchor point and second anchor point may be provided.
   If boundingVolume is BV_FRUSTUM, ((x,y,z)_topleft,w,h) may be provided for each anchor point of the path segment.
   If boundingVolume is BV_SPHERE, r as radius of the sphere may be provided for each anchor point of the path segment.
If intrinsicParameters is true, the intrinsic parameter object may be modified.

A presentation engine (e.g., presentation engine 114 of FIG. 2 or another element of client device 40, which may be different than the components shown in FIGS. 1 and 2) may support the MPEG_camera_control extension or other such data structure. If the scene provides camera control information, the Presentation Engine may limit the camera movement to the indicated paths, so that the (x,y,z) coordinates of the camera always lie on a path segment or within the bounding volume of a path segment. The Presentation Engine may provide visual, acoustic, and/or haptic feedback to the viewer when they approach the boundary of the bounding volume.

Figure 6:
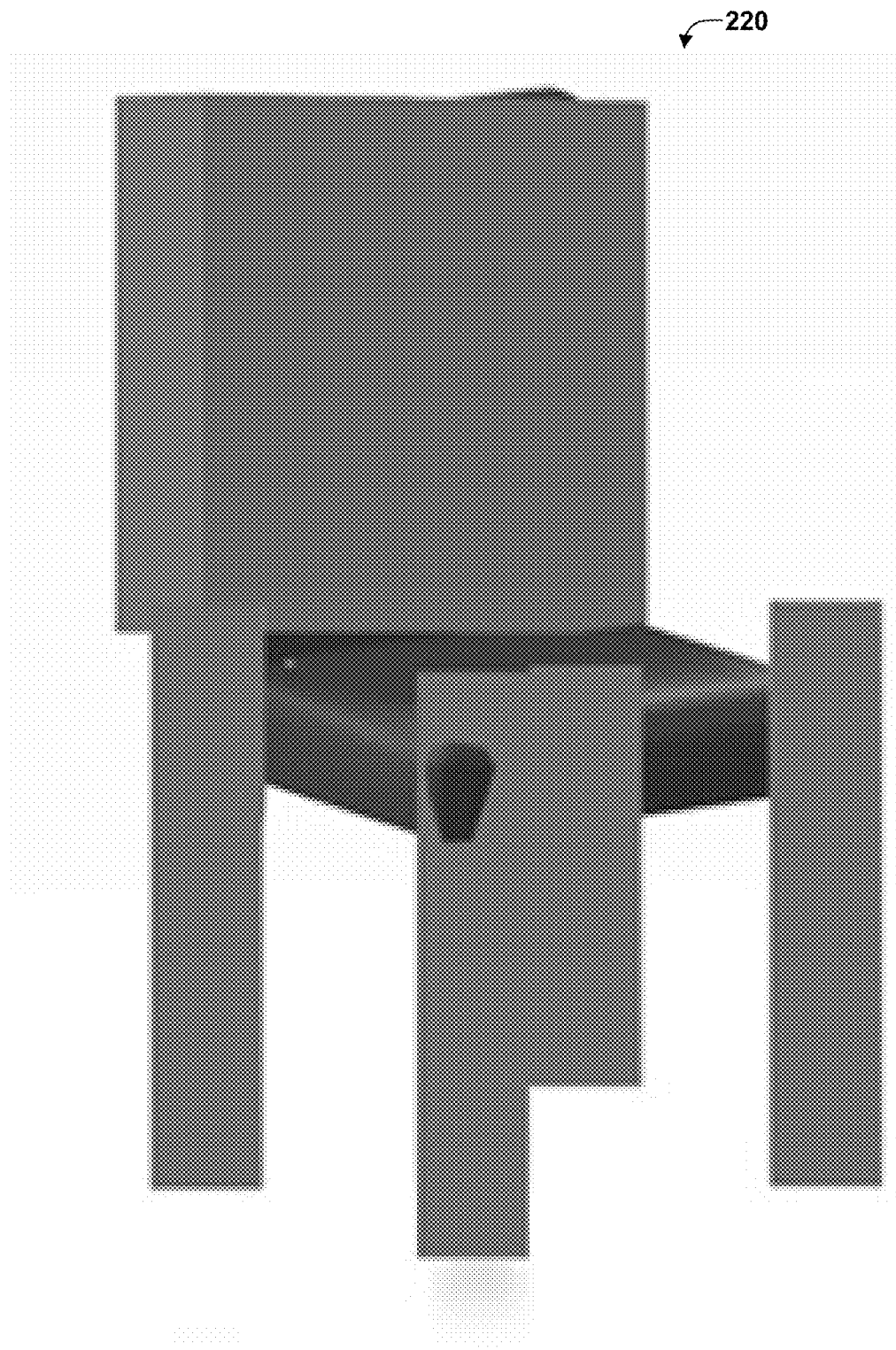
FIG. 6 is a conceptual diagram illustrating an example virtual object, which is a chair in this example.

FIG. 6 is a conceptual diagram illustrating an example virtual object 220, which is a chair in this example. In order to provide an immersive experience to the viewer, it is important that the viewer interacts properly with objects in the scene. The viewer should not be able to walk through solid objects in the scene, such as walls, chairs, and tables, or other such solid objects.

FIG. 6 depicts a 3D mesh representation of a chair, together with collision boundaries, defined as a set of cuboids. An MPEG_mesh_collision extension data structure may be defined to provide a description of collision boundaries of such a 3D mesh. The extension data structure may be defined on mesh objects as a set of cuboids around a mesh geometry. Table 2 below represents an example set of properties that may be included in such an extension data structure.

TABLE 2

| Name | Type | Default | Description |
| --- | --- | --- | --- |
| boundaries | Array(object) | N/A | Array of boundary shapes that are used to define the collision boundaries of the mesh object. The boundaries may be spheres or cuboids. |
| static | boolean | True | Determines if the object is affected by collisions or not. An object that is static will not be affected by collisions, which means that when the viewer or another object collides with this object, its position will not be altered. |
| material | number | N/A | The index of a collision material that defines how colliding objects or viewers will interact with this object. This may include bounciness, friction, etc. |

TABLE 2-continued

| Name | Type | Default | Description |
| --- | --- | --- | --- |
| animations | Array(object) | N/A | Defines animations that are triggered by a collision or action on this object. The animation may be limited to a subset of other objects, e.g. only the viewer may trigger this animation. It also contains a pointer to the animation that is to be executed when triggered. |

Mesh collision information may include cuboid vertex coordinates (x,y,z) for cuboid boundaries or a sphere center and radius for spherical boundaries. The values may be provided as floating point numbers.

The Presentation Engine may support the MPEG_mesh_collision extension or other such data structure. The presentation engine may ensure that a camera position (x,y,z) does not become contained within one of the defined mesh cuboids at any point of time. Collision may be signaled to the viewer through visual, acoustic, and/or haptic feedback. The presentation engine may use information on the boundaries for the nodes to initialize and configure a 3D physics engine that will detect collisions.

Figure 7:
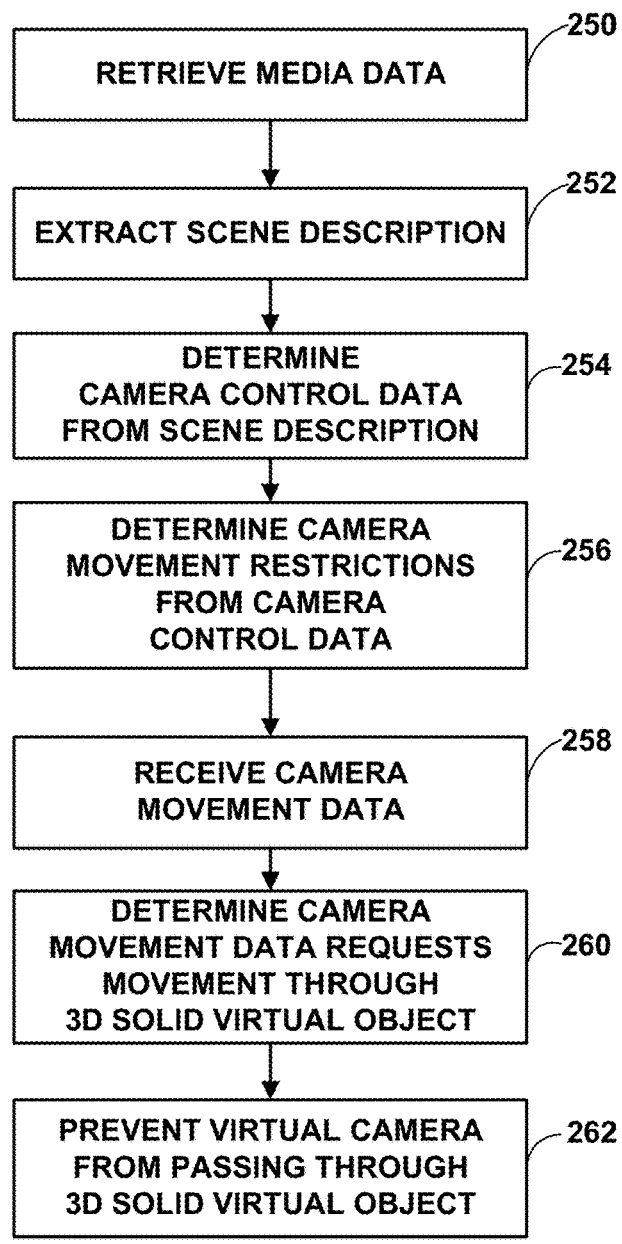
FIG. 7 is a flowchart illustrating an example method of retrieving media data according to the techniques of this disclosure.

FIG. 7 is a flowchart illustrating an example method of retrieving media data according to the techniques of this disclosure. The method of FIG. 7 is explained with respect to client device 40 of FIG. 1 and retrieval unit 52 of FIG. 2. Other such devices may be configured to perform this or a similar method.

Initially, client device 40 may retrieve media data (250). For example, retrieval unit 52 may retrieve media data, e.g., conforming to glTF 2.0. In some examples, retrieval unit 52 may retrieve the media data directly, e.g., according to unicast, such as using DASH. In some examples, a middleware unit of retrieval unit 52, such as eMBMS middleware 100 of FIG. 2, may receive the media data via broadcast or multicast, then a DASH client, e.g., DASH client 110 of FIG. 2, may retrieve the media data from the middleware unit.

The media data may include a scene description. Accordingly, retrieval unit 52 or another component of client device 40 may extract the scene description from the media data (252). The scene description may be an MPEG scene description including camera control data according to the techniques of this disclosure. Retrieval unit 52 may provide the scene description to presentation engine 114. Presentation engine 114 may thus receive the scene description and, in turn, determine the camera control data for a three-dimensional scene from the scene description (254). The camera control data may conform to Table 1 above. That is, for example, the camera control data may include one or more anchor points for camera paths, one or more segments between the anchor points for the camera paths, a bounding volume such as a cone, frustum, or sphere, intrinsic parameters that may be modified at each anchor point, and/or an accessor that provides the camera control information.

Presentation engine 114 may further determine movement restrictions from the cameral control data (256). For example, presentation engine 114 may determine two or more anchor points and allowable paths between the anchor points from the movement restrictions of the camera control data. Additionally or alternatively, presentation engine 114 may determine a bounding volume, such as a cube, sphere, frustum, cone, or the like, from the movement restrictions of the camera control data. Presentation engine 114 may use the allowable paths to determine paths along which a virtual camera is permitted to move and/or that the virtual camera is permitted to move within the bounding volume but not outside of the bounding volume. The allowable paths and/or bounding volume may be defined to ensure that the virtual camera does not pass beyond a 3D solid virtual object, such as a wall. That is, the bounding volume or allowable paths may be defined to be within one or more 3D solid virtual objects, such as walls, floor, ceiling, or other objects within a 3D virtual scene.

Presentation engine 114 may then receive camera movement data (258). For example, presentation engine 114 may receive data from one or more controllers, such as handheld controllers and/or a headset including a display, representing an orientation of the headset and movements of the headset and/or virtual camera, such as directional movement and/or rotational movement. Presentation engine 114 may determine that the camera movement data requests camera movement through a 3D solid virtual object (260), such as beyond the bounds of the bounding volume or along a path that is not one of the defined allowable paths. In response, presentation engine 114 may prevent the virtual camera from passing through the 3D solid virtual object (262).

In this manner, the method of FIG. 7 represents an example of a method of retrieving media data including receiving, by a presentation engine, streamed media data representing a virtual three-dimensional scene including at least one virtual solid object; receiving, by the presentation engine, camera control data for the three-dimensional scene, the camera control data including data defining restrictions to prevent a virtual camera from passing through the at least one virtual solid object; receiving, by the presentation engine, camera movement data from a user requesting that the virtual camera move through the at least one virtual solid object; and using the camera control data, preventing, by the presentation engine, the virtual camera from passing through the at least one virtual solid object in response to the camera movement data.

Figure 8:
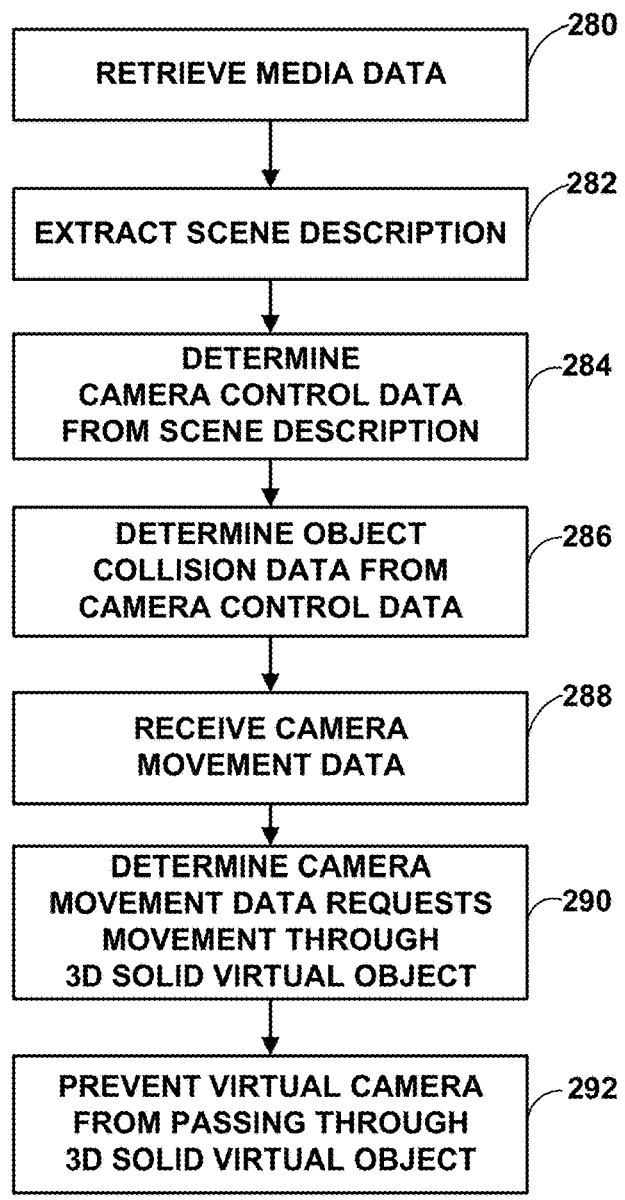
FIG. 8 is a flowchart illustrating an example method of retrieving media data according to the techniques of this disclosure.

FIG. 8 is a flowchart illustrating an example method of retrieving media data according to the techniques of this disclosure. The method of FIG. 8 is explained with respect to client device 40 of FIG. 1 and retrieval unit 52 of FIG. 2. Other such devices may be configured to perform this or a similar method.

Initially, client device 40 may retrieve media data (280). For example, retrieval unit 52 may retrieve media data, e.g., conforming to glTF 2.0. In some examples, retrieval unit 52 may retrieve the media data directly, e.g., according to unicast, such as using DASH. In some examples, a middleware unit of retrieval unit 52, such as eMBMS middleware 100 of FIG. 2, may receive the media data via broadcast or multicast, then a DASH client, e.g., DASH client 110 of FIG. 2, may retrieve the media data from the middleware unit.

The media data may include a scene description. Accordingly, retrieval unit 52 or another component of client device 40 may extract the scene description from the media data (282). The scene description may be an MPEG scene description including object collision data according to the techniques of this disclosure. Retrieval unit 52 may provide the scene description to presentation engine 114. Presentation engine 114 may thus receive the scene description and, in turn, determine the object collision data for one or more 3D solid virtual objects from the scene description (284). The object collision data may conform to Table 2 above. That is, the object collision data may include data representing, for example, boundaries representing an array of boundary shapes defining collision boundaries of a mesh (3D virtual solid) object, data indicating whether the object is static (that is, movable), material representing a collision material for the object, and/or animations to be presented for the object in the event of a collision.

Presentation engine 114 may further determine the object collision data from the cameral control data (286). For example, presentation engine 114 may determine boundaries representing an array of boundary shapes defining collision boundaries of a mesh (3D virtual solid) object, data indicating whether the object is static (that is, movable), material representing a collision material for the object, and/or animations to be presented for the object in the event of a collision. Presentation engine 114 may use the object collision data to determine how to react in the event of a collision with the 3D solid virtual object.

Presentation engine 114 may then receive camera movement data (288). For example, presentation engine 114 may receive data from one or more controllers, such as handheld controllers and/or a headset including a display, representing an orientation of the headset and movements of the headset and/or virtual camera, such as directional movement and/or rotational movement. Presentation engine 114 may determine that the camera movement data requests camera movement through the 3D solid virtual object (290), such as into a 3D solid virtual object defined by the object collision data. In response, presentation engine 114 may prevent the virtual camera from passing through the 3D solid virtual object (292). For example, if the object is static as indicated by the object collision data, presentation engine 114 may prevent the virtual camera from moving into and through the object. As another example, if the object is not static (e.g., movable), presentation engine 114 may determine a reaction from the object collision data in response to a collision with the object, such as an animation to play on the object, e.g., if the object is to tip over or move.

In this manner, the method of FIG. 8 represents an example of a method of retrieving media data including receiving, receiving, by a presentation engine, streamed media data representing a virtual three-dimensional scene including at least one virtual solid object; receiving, by the presentation engine, object collision data representing boundaries of the at least one virtual solid object; receiving, by the presentation engine, camera movement data from a user requesting that the virtual camera move through the at least one virtual solid object; and using the object collision data, preventing, by the presentation engine, the virtual camera from passing through the at least one virtual solid object in response to the camera movement data.

Certain examples of the techniques of this disclosure are summarized in the following clauses:

Clause 1: A method of retrieving media data, the method comprising: receiving, by a presentation engine, streamed media data representing a virtual three-dimensional scene including at least one virtual solid object; receiving, by the presentation engine, camera control data for the three-dimensional scene, the camera control data including data defining permissible locations for a virtual camera; receiving, by the presentation engine, camera movement data from a user requesting that the virtual camera move through the at least one virtual solid object; and using the camera control data, updating, by the presentation engine, a location of the virtual camera to ensure the virtual camera remains within the permissible locations.

Clause 2: The method of clause 1, wherein updating the location of the virtual camera comprises preventing the virtual camera from passing through the at least one virtual solid object.

Clause 3: The method of clause 1, wherein the streamed media data comprises glTF 2.0 media data.

Clause 4: The method of clause 1, wherein receiving the streamed media data comprises requesting the streamed media data from a retrieval unit via an application programming interface (API).

Clause 5: The method of clause 1, wherein the camera control data is included in an MPEG scene description.

Clause 6: The method of clause 1, wherein the camera control data includes data defining two or more anchor points and one or more segments between the anchor points, the segments representing permissible camera movement vectors for the virtual camera, and wherein updating the location of the virtual camera comprises allowing the virtual camera to only traverse the segments between the anchor points.

Clause 7: The method of clause 1, wherein the camera control data includes data defining a bounding volume representing a permissible camera movement volume for the virtual camera, and wherein updating the location of the virtual camera comprises allowing the virtual camera to only traverse the permissible camera movement volume.

Clause 8: The method of clause 7, wherein the data defining the bounding volume comprises data defining at least one of a cone, a frustrum, or a sphere.

Clause 9: The method of clause 1, wherein the camera control data is included in an MPEG_camera_control extension.

Clause 10: The method of clause 9, wherein the MPEG_camera_control extension includes one or more of: anchors data representing a number of anchor points for permissible paths for the virtual camera; segments data representing a number of path segments for the permissible paths between the anchor points; bounding volume data representing a bounding volume for the virtual camera; intrinsic parameters indicating whether camera parameters are modified at each of the anchor points; and accessor data representing an index of an accessor that provides the camera control data.

Clause 11: The method of clause 1, wherein the at least one virtual solid object comprises one of a virtual wall, a virtual chair, or a virtual table.

Clause 12: The method of clause 1, further comprising determining permissible paths for the virtual camera from the camera control data, wherein updating the location of the virtual camera comprises ensuring that the virtual camera moves only along virtual paths that are within the permissible paths defined in the camera control data.

Clause 13: The method of clause 1, wherein the camera control data is included in an MPEG_mesh_collision extension.

Clause 14: A device for retrieving media data, the device comprising: a memory configured to store media data; and one or more processors implemented in circuitry and configured to execute a presentation engine, the presentation engine being configured to: receive streamed media data representing a virtual three-dimensional scene including at least one virtual solid object; receive camera control data for the three-dimensional scene, the camera control data including data defining permissible locations for a virtual camera; receive camera movement data from a user requesting that the virtual camera move through the at least one virtual solid object; and using the camera control data, update a location of the virtual camera to ensure the virtual camera remains within the permissible locations.

Clause 15: The device of clause 14, wherein the presentation engine is configured to prevent the virtual camera from passing through the at least one virtual solid object.

Clause 16: The device of clause 14, wherein the streamed media data comprises glTF 2.0 media data.

Clause 17: The device of clause 14, wherein the presentation engine is configured to request the streamed media data from a retrieval unit via an application programming interface (API).

Clause 18: The device of clause 14, wherein the camera control data is included in an MPEG scene description.

Clause 19: The device of clause 14, wherein the camera control data includes data defining two or more anchor points and one or more segments between the anchor points, the segments representing permissible camera movement vectors for the virtual camera, and wherein to update the location of the virtual camera, the presentation engine is configured to allow the virtual camera to only traverse the segments between the anchor points.

Clause 20: The device of clause 14, wherein the camera control data includes data defining a bounding volume representing a permissible camera movement volume for the virtual camera, and wherein to update the location of the virtual camera, the presentation engine is configured to allow the virtual camera to only traverse the permissible camera movement volume.

Clause 21: The device of clause 20, wherein the data defining the bounding volume comprises data defining at least one of a cone, a frustrum, or a sphere.

Clause 22: The device of clause 14, wherein the camera control data is included in an MPEG_camera_control extension.

Clause 23: The device of clause 22, wherein the MPEG_camera_control extension includes one or more of: anchors data representing a number of anchor points for permissible paths for the virtual camera; segments data representing a number of path segments for the permissible paths between the anchor points; bounding volume data representing a bounding volume for the virtual camera; intrinsic parameters indicating whether camera parameters are modified at each of the anchor points; and accessor data representing an index of an accessor that provides the camera control data.

Clause 24: The device of clause 14, wherein the at least one virtual solid object comprises one of a virtual wall, a virtual chair, or a virtual table.

Clause 25: The device of clause 14, wherein the presentation engine is further configured to determine permissible paths for the virtual camera from the camera control data, wherein to update the location of the virtual camera, the presentation engine is configured to ensure that the virtual camera moves only along virtual paths that are within the permissible paths defined in the camera control data.

Clause 26: The device of clause 14, wherein the camera control data is included in an MPEG_mesh_collision extension.

Clause 27: A computer-readable storage medium having stored thereon instructions that, when executed, cause a processor executing a presentation engine to: receive streamed media data representing a virtual three-dimensional scene including at least one virtual solid object; receive camera control data for the three-dimensional scene, the camera control data including data defining permissible locations for a virtual camera; receive camera movement data from a user requesting that the virtual camera move through the at least one virtual solid object; and using the camera control data, update a location of the virtual camera to ensure the virtual camera remains within the permissible locations.

Clause 28: The computer-readable storage medium of clause 27, wherein the instructions that cause the processor to update the location of the virtual camera comprise instructions that cause the processor to prevent the virtual camera from passing through the at least one virtual solid object.

Clause 29: The computer-readable medium of clause 27, wherein the streamed media data comprises glTF 2.0 media data.

Clause 30: The computer-readable medium of clause 27, wherein the instructions that cause the processor to receive the streamed media data comprise instructions that cause the processor to request the streamed media data from a retrieval unit via an application programming interface (API).

Clause 31: The computer-readable medium of clause 27, wherein the camera control data is included in an MPEG scene description.

Clause 32: The computer-readable medium of clause 27, wherein the camera control data includes data defining two or more anchor points and one or more segments between the anchor points, the segments representing permissible camera movement vectors for the virtual camera, and wherein the instructions that cause the processor to update the location of the virtual camera comprise instructions that cause the processor to allow the virtual camera to only traverse the segments between the anchor points.

Clause 33: The computer-readable medium of clause 27, wherein the camera control data includes data defining a bounding volume representing a permissible camera movement volume for the virtual camera, and wherein the instructions that cause the processor to update the location of the virtual camera comprise instructions that cause the processor to allow the virtual camera to only traverse the permissible camera movement volume.

Clause 34: The computer-readable medium of clause 20, wherein the data defining the bounding volume comprises data defining at least one of a cone, a frustrum, or a sphere.

Clause 35: The computer-readable medium of clause 27, wherein the camera control data is included in an MPEG_camera_control extension.

Clause 36: The computer-readable medium of clause 22, wherein the MPEG_camera_control extension includes one or more of: anchors data representing a number of anchor points for permissible paths for the virtual camera; segments data representing a number of path segments for the permissible paths between the anchor points; bounding volume data representing a bounding volume for the virtual camera; intrinsic parameters indicating whether camera parameters are modified at each of the anchor points; and accessor data representing an index of an accessor that provides the camera control data.

Clause 37: The computer-readable medium of clause 27, wherein the at least one virtual solid object comprises one of a virtual wall, a virtual chair, or a virtual table.

Clause 38: The computer-readable medium of clause 27, further comprising instructions that cause the processor to determine permissible paths for the virtual camera from the camera control data, wherein the instructions that cause the processor to update the location of the virtual camera comprise instructions that cause the processor to ensure that the virtual camera moves only along virtual paths that are within the permissible paths defined in the camera control data.

Clause 39: The computer-readable medium of clause 27, wherein the camera control data is included in an MPEG_mesh_collision extension.

Clause 40: A device for retrieving media data, the device comprising: means for receiving streamed media data representing a virtual three-dimensional scene including at least one virtual solid object; means for receiving camera control data for the three-dimensional scene, the camera control data including data defining permissible locations for a virtual camera; means for receiving camera movement data from a user requesting that the virtual camera move through the at least one virtual solid object; and means for updating a location of the virtual camera to ensure the virtual camera remains within the permissible locations using the camera control data.

Clause 41: A method of retrieving media data, the method comprising: receiving, by a presentation engine, streamed media data representing a virtual three-dimensional scene including at least one virtual solid object; receiving, by the presentation engine, object collision data representing boundaries of the at least one virtual solid object; receiving, by the presentation engine, camera movement data from a user requesting that a virtual camera move through the at least one virtual solid object; and using the object collision data, updating, by the presentation engine, a location of the virtual camera to ensure the virtual camera remains outside of the at least one virtual solid object in response to the camera movement data.

Clause 42: The method of clause 41, wherein updating the location of the virtual camera comprises preventing the virtual camera from passing through the at least virtual solid object.

Clause 43: The method of clause 41, wherein receiving the object collision data comprises receiving an MPEG_mesh_collision extension.

Clause 44: The method of clause 43, wherein the MPEG_mesh_collision extension includes data defining at least one 3D mesh for the at least one virtual solid object.

Clause 45: The method of clause 44, wherein the MPEG_mesh_collision extension includes data defining at least one of boundaries of a 3D mesh for the at least one virtual solid object, a material for the 3D mesh, or animations to be presented in response to the virtual camera contacting the 3D mesh.

Clause 46: The method of clause 41, wherein receiving the object collision data comprises receiving data including one or more of: boundaries data representing one or more collision boundaries of the at least one virtual solid object; static data representing whether the at least one virtual solid object is affected by collisions; material data representing how colliding objects interact with the at least one virtual solid object; or animations data representing animations triggered by a collision with the at least one virtual solid object.

Clause 47: The method of clause 41, wherein the at least one virtual solid object comprises one of a virtual wall, a virtual chair, or a virtual table.

Clause 48: The method of clause 41, wherein the streamed media data comprises glTF 2.0 media data.

Clause 49: The method of clause 41, wherein receiving the streamed media data comprises requesting the streamed media data from a retrieval unit via an application programming interface (API).

Clause 50: The method of clause 41, wherein the object collision data is included in an MPEG scene description.

Clause 51: A device for retrieving media data, the device comprising: a memory configured to store media data; and one or more processors implemented in circuitry and configured to execute a presentation engine configured to: receive streamed media data representing a virtual three-dimensional scene including at least one virtual solid object; receive object collision data representing boundaries of the at least one virtual solid object; receive camera movement data from a user requesting that a virtual camera move through the at least one virtual solid object; and using the object collision data, update a location of the virtual camera to ensure the virtual camera remains outside of the at least one virtual solid object in response to the camera movement data.

Clause 52: The device of clause 51, wherein to update the location of the virtual camera, the presentation engine is configured to prevent the virtual camera from passing through the at least virtual solid object.

Clause 53: The device of clause 51, wherein to receive the object collision data, the presentation engine is configured to receive an MPEG_mesh_collision extension.

Clause 54: The device of clause 53, wherein the MPEG_mesh_collision extension includes data defining at least one 3D mesh for the at least one virtual solid object.

Clause 55: The device of clause 54, wherein the MPEG_mesh_collision extension includes data defining at least one of boundaries of a 3D mesh for the at least one virtual solid object, a material for the 3D mesh, or animations to be presented in response to the virtual camera contacting the 3D mesh.

Clause 56: The device of clause 51, wherein to receive the object collision data, the presentation engine is configured to receive data including one or more of: boundaries data representing one or more collision boundaries of the at least one virtual solid object; static data representing whether the at least one virtual solid object is affected by collisions; material data representing how colliding objects interact with the at least one virtual solid object; or animations data representing animations triggered by a collision with the at least one virtual solid object.

Clause 57: The device of clause 51, wherein the at least one virtual solid object comprises one of a virtual wall, a virtual chair, or a virtual table.

Clause 58: The device of clause 51, wherein the streamed media data comprises glTF 2.0 media data.

Clause 59: The device of clause 51, wherein to receive the streamed media data, the presentation engine is configured to request the streamed media data from a retrieval unit via an application programming interface (API).

Clause 60: The device of clause 51, wherein the object collision data is included in an MPEG scene description.

Clause 61: A computer-readable storage medium having stored thereon instructions that, when executed, cause a processor to: receive streamed media data representing a virtual three-dimensional scene including at least one virtual solid object; receive object collision data representing boundaries of the at least one virtual solid object; receive camera movement data from a user requesting that a virtual camera move through the at least one virtual solid object; and using the object collision data, update a location of the virtual camera to ensure the virtual camera remains outside of the at least one virtual solid object in response to the camera movement data.

Clause 62: The computer-readable medium of clause 61, wherein the instructions that cause the processor to update the location of the virtual camera comprise instructions that cause the processor to prevent the virtual camera from passing through the at least virtual solid object.

Clause 63: The computer-readable medium of clause 61, wherein the instructions that cause the processor to receive the object collision data comprise instructions that cause the processor to receive an MPEG_mesh_collision extension.

Clause 64: The computer-readable medium of clause 62, wherein the MPEG_mesh_collision extension includes data defining at least one 3D mesh for the at least one virtual solid object.

Clause 65: The computer-readable medium of clause 63, wherein the MPEG_mesh_collision extension includes data defining at least one of boundaries of a 3D mesh for the at least one virtual solid object, a material for the 3D mesh, or animations to be presented in response to the virtual camera contacting the 3D mesh.

Clause 66: The computer-readable medium of clause 61, wherein the instructions that cause the processor to receive the object collision data comprise instructions that cause the processor to receive data including one or more of: boundaries data representing one or more collision boundaries of the at least one virtual solid object; static data representing whether the at least one virtual solid object is affected by collisions; material data representing how colliding objects interact with the at least one virtual solid object; or animations data representing animations triggered by a collision with the at least one virtual solid object.

Clause 67: The computer-readable medium of clause 61, wherein the at least one virtual solid object comprises one of a virtual wall, a virtual chair, or a virtual table.

Clause 68: The computer-readable medium of clause 61, wherein the streamed media data comprises glTF 2.0 media data.

Clause 69: The computer-readable medium of clause 61, wherein the instructions that cause the processor to receive the streamed media data comprise instructions that cause the processor to request the streamed media data from a retrieval unit via an application programming interface (API).

Clause 70: The computer-readable medium of clause 61, wherein the object collision data is included in an MPEG scene description.

Clause 71: A device for retrieving media data, the device comprising: means for receiving streamed media data representing a virtual three-dimensional scene including at least one virtual solid object; means for receiving object collision data representing boundaries of the at least one virtual solid object; means for receiving camera movement data from a user requesting that a virtual camera move through the at least one virtual solid object; and means for updating a location of the virtual camera to ensure the virtual camera remains outside of the at least one virtual solid object in response to the camera movement data.

Clause 72: A method of retrieving media data, the method comprising: receiving, by a presentation engine, streamed media data representing a virtual three-dimensional scene including at least one virtual solid object; receiving, by the presentation engine, camera control data for the three-dimensional scene, the camera control data including data defining permissible locations for a virtual camera; receiving, by the presentation engine, camera movement data from a user requesting that the virtual camera move through the at least one virtual solid object; and using the camera control data, updating, by the presentation engine, a location of the virtual camera to ensure the virtual camera remains within the permissible locations.

Clause 73: The method of clause 72, wherein updating the location of the virtual camera comprises preventing the virtual camera from passing through the at least one virtual solid object.

Clause 74: The method of any of clauses 72 and 73, wherein the streamed media data comprises glTF 2.0 media data.

Clause 75: The method of any of clauses 72-74, wherein receiving the streamed media data comprises requesting the streamed media data from a retrieval unit via an application programming interface (API).

Clause 76: The method of any of clauses 72-75, wherein the camera control data is included in an MPEG scene description.

Clause 77: The method of any of clauses 72-76, wherein the camera control data includes data defining two or more anchor points and one or more segments between the anchor points, the segments representing permissible camera movement vectors for the virtual camera, and wherein updating the location of the virtual camera comprises allowing the virtual camera to only traverse the segments between the anchor points.

Clause 78: The method of any of clauses 72-77, wherein the camera control data includes data defining a bounding volume representing a permissible camera movement volume for the virtual camera, and wherein updating the location of the virtual camera comprises allowing the virtual camera to only traverse the permissible camera movement volume.

Clause 79: The method of clause 78, wherein the data defining the bounding volume comprises data defining at least one of a cone, a frustrum, or a sphere.

Clause 80: The method of any of clauses 72-79, wherein the camera control data is included in an MPEG_camera_control extension.

Clause 81: The method of clause 80, wherein the MPEG_camera_control extension includes one or more of: anchors data representing a number of anchor points for permissible paths for the virtual camera; segments data representing a number of path segments for the permissible paths between the anchor points; bounding volume data representing a bounding volume for the virtual camera; intrinsic parameters indicating whether camera parameters are modified at each of the anchor points; and accessor data representing an index of an accessor that provides the camera control data.

Clause 82: The method of any of clauses 72-81, wherein the at least one virtual solid object comprises one of a virtual wall, a virtual chair, or a virtual table.

Clause 83: The method of clause 72, further comprising determining permissible paths for the virtual camera from the camera control data, wherein updating the location of the virtual camera comprises ensuring that the virtual camera moves only along virtual paths that are within the permissible paths defined in the camera control data.

Clause 84: The method of any of clauses 72-83, wherein the camera control data is included in an MPEG_mesh_collision extension.

Clause 85: A device for retrieving media data, the device comprising: a memory configured to store media data; and one or more processors implemented in circuitry and configured to execute a presentation engine, the presentation engine being configured to: receive streamed media data representing a virtual three-dimensional scene including at least one virtual solid object; receive camera control data for the three-dimensional scene, the camera control data including data defining permissible locations for a virtual camera; receive camera movement data from a user requesting that the virtual camera move through the at least one virtual solid object; and using the camera control data, update a location of the virtual camera to ensure the virtual camera remains within the permissible locations.

Clause 86: The device of clause 85, wherein the presentation engine is configured to prevent the virtual camera from passing through the at least one virtual solid object.

Clause 87: The device of any of clauses 85 and 86, wherein the streamed media data comprises glTF 2.0 media data.

Clause 88: The device of any of clauses 85-87, wherein the presentation engine is configured to request the streamed media data from a retrieval unit via an application programming interface (API).

Clause 89: The device of any of clauses 85-88, wherein the camera control data is included in an MPEG scene description.

Clause 90: The device of any of clauses 85-89, wherein the camera control data includes data defining two or more anchor points and one or more segments between the anchor points, the segments representing permissible camera movement vectors for the virtual camera, and wherein to update the location of the virtual camera, the presentation engine is configured to allow the virtual camera to only traverse the segments between the anchor points.

Clause 91: The device of any of clauses 85-90, wherein the camera control data includes data defining a bounding volume representing a permissible camera movement volume for the virtual camera, and wherein to update the location of the virtual camera, the presentation engine is configured to allow the virtual camera to only traverse the permissible camera movement volume.

Clause 92: The device of clause 91, wherein the data defining the bounding volume comprises data defining at least one of a cone, a frustrum, or a sphere.

Clause 93: The device of any of clauses 85-92, wherein the camera control data is included in an MPEG_camera_control extension.

Clause 94: The device of clause 93, wherein the MPEG_camera_control extension includes one or more of: anchors data representing a number of anchor points for permissible paths for the virtual camera; segments data representing a number of path segments for the permissible paths between the anchor points; bounding volume data representing a bounding volume for the virtual camera; intrinsic parameters indicating whether camera parameters are modified at each of the anchor points; and accessor data representing an index of an accessor that provides the camera control data.

Clause 95: The device of any of clauses 85-94, wherein the at least one virtual solid object comprises one of a virtual wall, a virtual chair, or a virtual table.

Clause 96: The device of any of clauses 85-95, wherein the presentation engine is further configured to determine permissible paths for the virtual camera from the camera control data, wherein to update the location of the virtual camera, the presentation engine is configured to ensure that the virtual camera moves only along virtual paths that are within the permissible paths defined in the camera control data.

Clause 97: The device of any of clauses 85-96, wherein the camera control data is included in an MPEG_mesh_collision extension.

Clause 98: A computer-readable storage medium having stored thereon instructions that, when executed, cause a processor executing a presentation engine to: receive streamed media data representing a virtual three-dimensional scene including at least one virtual solid object; receive camera control data for the three-dimensional scene, the camera control data including data defining permissible locations for a virtual camera; receive camera movement data from a user requesting that the virtual camera move through the at least one virtual solid object; and using the camera control data, update a location of the virtual camera to ensure the virtual camera remains within the permissible locations.

Clause 99: The computer-readable storage medium of clause 98, wherein the instructions that cause the processor to update the location of the virtual camera comprise instructions that cause the processor to prevent the virtual camera from passing through the at least one virtual solid object.

Clause 100: The computer-readable medium of any of clauses 98 and 99, wherein the streamed media data comprises glTF 2.0 media data.

Clause 101: The computer-readable medium of any of clauses 98-100, wherein the instructions that cause the processor to receive the streamed media data comprise instructions that cause the processor to request the streamed media data from a retrieval unit via an application programming interface (API).

Clause 102: The computer-readable medium of any of clauses 98-101, wherein the camera control data is included in an MPEG scene description.

Clause 103: The computer-readable medium of any of clauses 98-102, wherein the camera control data includes data defining two or more anchor points and one or more segments between the anchor points, the segments representing permissible camera movement vectors for the virtual camera, and wherein the instructions that cause the processor to update the location of the virtual camera comprise instructions that cause the processor to allow the virtual camera to only traverse the segments between the anchor points.

Clause 104: The computer-readable medium of clause 103, wherein the camera control data includes data defining a bounding volume representing a permissible camera movement volume for the virtual camera, and wherein the instructions that cause the processor to update the location of the virtual camera comprise instructions that cause the processor to allow the virtual camera to only traverse the permissible camera movement volume.

Clause 105: The computer-readable medium of any of clauses 98-104, wherein the data defining the bounding volume comprises data defining at least one of a cone, a frustrum, or a sphere.

Clause 106: The computer-readable medium of clause 105, wherein the camera control data is included in an MPEG_camera_control extension.

Clause 107: The computer-readable medium of any of clauses 98-106, wherein the MPEG_camera_control extension includes one or more of: anchors data representing a number of anchor points for permissible paths for the virtual camera; segments data representing a number of path segments for the permissible paths between the anchor points; bounding volume data representing a bounding volume for the virtual camera; intrinsic parameters indicating whether camera parameters are modified at each of the anchor points; and accessor data representing an index of an accessor that provides the camera control data.

Clause 108: The computer-readable medium of any of clauses 98-107, wherein the at least one virtual solid object comprises one of a virtual wall, a virtual chair, or a virtual table.

Clause 109: The computer-readable medium of any of clauses 98-108, further comprising instructions that cause the processor to determine permissible paths for the virtual camera from the camera control data, wherein the instructions that cause the processor to update the location of the virtual camera comprise instructions that cause the processor to ensure that the virtual camera moves only along virtual paths that are within the permissible paths defined in the camera control data.

Clause 110: The computer-readable medium of any of clauses 98-109, wherein the camera control data is included in an MPEG_mesh_collision extension.

Clause 111: A device for retrieving media data, the device comprising: means for receiving streamed media data representing a virtual three-dimensional scene including at least one virtual solid object; means for receiving camera control data for the three-dimensional scene, the camera control data including data defining permissible locations for a virtual camera; means for receiving camera movement data from a user requesting that the virtual camera move through the at least one virtual solid object; and means for updating a location of the virtual camera to ensure the virtual camera remains within the permissible locations using the camera control data.

Clause 112: A method of retrieving media data, the method comprising: receiving, by a presentation engine, streamed media data representing a virtual three-dimensional scene including at least one virtual solid object; receiving, by the presentation engine, object collision data representing boundaries of the at least one virtual solid object; receiving, by the presentation engine, camera movement data from a user requesting that a virtual camera move through the at least one virtual solid object; and using the object collision data, updating, by the presentation engine, a location of the virtual camera to ensure the virtual camera remains outside of the at least one virtual solid object in response to the camera movement data.

Clause 113: A method comprising a combination of the method of any of clauses 72-84 and the method of clause 112.

Clause 114: The method of any of clauses 112 and 113, wherein updating the location of the virtual camera comprises preventing the virtual camera from passing through the at least virtual solid object.

Clause 115: The method of any of clauses 112-114, wherein receiving the object collision data comprises receiving an MPEG_mesh_collision extension.

Clause 116: The method of clause 115, wherein the MPEG_mesh_collision extension includes data defining at least one 3D mesh for the at least one virtual solid object.

Clause 117: The method of clause 116, wherein the MPEG_mesh_collision extension includes data defining at least one of boundaries of a 3D mesh for the at least one virtual solid object, a material for the 3D mesh, or animations to be presented in response to the virtual camera contacting the 3D mesh.

Clause 118: The method of any of clauses 112-117, wherein receiving the object collision data comprises receiving data including one or more of: boundaries data representing one or more collision boundaries of the at least one virtual solid object; static data representing whether the at least one virtual solid object is affected by collisions; material data representing how colliding objects interact with the at least one virtual solid object; or animations data representing animations triggered by a collision with the at least one virtual solid object.

Clause 119: The method of any of clauses 112-118, wherein the at least one virtual solid object comprises one of a virtual wall, a virtual chair, or a virtual table.

Clause 120: The method of any of clauses 112-119, wherein the streamed media data comprises glTF 2.0 media data.

Clause 121: The method of any of clauses 112-120, wherein receiving the streamed media data comprises requesting the streamed media data from a retrieval unit via an application programming interface (API).

Clause 122: The method of any of clauses 112-121, wherein the object collision data is included in an MPEG scene description.

Clause 123: A device for retrieving media data, the device comprising: a memory configured to store media data; and one or more processors implemented in circuitry and configured to execute a presentation engine configured to: receive streamed media data representing a virtual three-dimensional scene including at least one virtual solid object; receive object collision data representing boundaries of the at least one virtual solid object; receive camera movement data from a user requesting that a virtual camera move through the at least one virtual solid object; and using the object collision data, update a location of the virtual camera to ensure the virtual camera remains outside of the at least one virtual solid object in response to the camera movement data.

Clause 124: A device comprising a combination of the device of any of clauses 85-97 and the device of clause 123.

Clause 125: The device of any of clauses 123 and 124, wherein to update the location of the virtual camera, the presentation engine is configured to prevent the virtual camera from passing through the at least virtual solid object.

Clause 126: The device of any of clauses 123-125, wherein to receive the object collision data, the presentation engine is configured to receive an MPEG_mesh_collision extension.

Clause 127: The device of clause 126, wherein the MPEG_mesh_collision extension includes data defining at least one 3D mesh for the at least one virtual solid object.

Clause 128: The device of clause 127, wherein the MPEG_mesh_collision extension includes data defining at least one of boundaries of a 3D mesh for the at least one virtual solid object, a material for the 3D mesh, or animations to be presented in response to the virtual camera contacting the 3D mesh.

Clause 129: The device of any of clauses 123-128, wherein to receive the object collision data, the presentation engine is configured to receive data including one or more of: boundaries data representing one or more collision boundaries of the at least one virtual solid object; static data representing whether the at least one virtual solid object is affected by collisions; material data representing how colliding objects interact with the at least one virtual solid object; or animations data representing animations triggered by a collision with the at least one virtual solid object.

Clause 130: The device of any of clauses 123-129, wherein the at least one virtual solid object comprises one of a virtual wall, a virtual chair, or a virtual table.

Clause 131: The device of any of clauses 123-130, wherein the streamed media data comprises glTF 2.0 media data.

Clause 132: The device of any of clauses 123-131, wherein to receive the streamed media data, the presentation engine is configured to request the streamed media data from a retrieval unit via an application programming interface (API).

Clause 133: The device of any of clauses 123-132, wherein the object collision data is included in an MPEG scene description.

Clause 134: A computer-readable storage medium having stored thereon instructions that, when executed, cause a processor to: receive streamed media data representing a virtual three-dimensional scene including at least one virtual solid object; receive object collision data representing boundaries of the at least one virtual solid object; receive camera movement data from a user requesting that a virtual camera move through the at least one virtual solid object; and using the object collision data, update a location of the virtual camera to ensure the virtual camera remains outside of the at least one virtual solid object in response to the camera movement data.

Clause 135: A computer-readable storage medium comprising a combination of the computer-readable storage medium of any of clauses 98-110 and the computer-readable storage medium of clause 134.

Clause 136: The computer-readable medium of any of clauses 134 and 135, wherein the instructions that cause the processor to update the location of the virtual camera comprise instructions that cause the processor to prevent the virtual camera from passing through the at least virtual solid object.

Clause 137: The computer-readable medium of any of clauses 134-136, wherein the instructions that cause the processor to receive the object collision data comprise instructions that cause the processor to receive an MPEG_mesh_collision extension.

Clause 138: The computer-readable medium of any of clauses 134-137, wherein the MPEG_mesh_collision extension includes data defining at least one 3D mesh for the at least one virtual solid object.

Clause 139: The computer-readable medium of any of clauses 134-138, wherein the MPEG_mesh_collision extension includes data defining at least one of boundaries of a 3D mesh for the at least one virtual solid object, a material for the 3D mesh, or animations to be presented in response to the virtual camera contacting the 3D mesh.

Clause 140: The computer-readable medium of any of clauses 134-139, wherein the instructions that cause the processor to receive the object collision data comprise instructions that cause the processor to receive data including one or more of: boundaries data representing one or more collision boundaries of the at least one virtual solid object; static data representing whether the at least one virtual solid object is affected by collisions; material data representing how colliding objects interact with the at least one virtual solid object; or animations data representing animations triggered by a collision with the at least one virtual solid object.

Clause 141: The computer-readable medium of any of clauses 134-140, wherein the at least one virtual solid object comprises one of a virtual wall, a virtual chair, or a virtual table.

Clause 142: The computer-readable medium of any of clauses 134-141, wherein the streamed media data comprises glTF 2.0 media data.

Clause 143: The computer-readable medium of any of clauses 134-142, wherein the instructions that cause the processor to receive the streamed media data comprise instructions that cause the processor to request the streamed media data from a retrieval unit via an application programming interface (API).

Clause 144: The computer-readable medium of any of clauses 134-143, wherein the object collision data is included in an MPEG scene description.

Clause 145: A method of retrieving media data, the method comprising: receiving, by a presentation engine, streamed media data representing a virtual three-dimensional scene including at least one virtual solid object; receiving, by the presentation engine, camera control data for the three-dimensional scene, the camera control data including data defining restrictions to prevent a virtual camera from passing through the at least one virtual solid object; receiving, by the presentation engine, camera movement data from a user requesting that the virtual camera move through the at least one virtual solid object; and using the camera control data, preventing the virtual camera from passing through the at least one virtual solid object in response to the camera movement data.

Clause 146: The method of clause 145, wherein the streamed media data comprises glTF 2.0 media data.

Clause 147: The method of any of clauses 145 and 146, wherein receiving the streamed media data comprises requesting the streamed media data from a retrieval unit via an application programming interface (API).

Clause 148: The method of any of clauses 145-147, wherein the camera control data is included in an MPEG scene description.

Clause 149: The method of any of clauses 145-148, wherein the camera control data is included in an MPEG_camera_control extension.

Clause 150: The method of clause 149, wherein the MPEG_camera_control extension includes data defining two or more anchor points and one or more segments between the anchor points, the segments representing permissible camera movement vectors.

Clause 151: The method of any of clauses 149 and 150, wherein the MPEG_camera_control extension includes data defining a bounding volume representing a permissible camera movement volume.

Clause 152: The method of clause 151, wherein the data defining the bounding volume comprises data defining at least one of a cone, a frustrum, or a sphere.

Clause 153: The method of any of clauses 149-152, wherein the MPEG_camera_control extension conforms to the data of Table 1 above.

Clause 154: The method of any of clauses 149-153, wherein the at least one virtual solid object comprises a virtual wall.

Clause 155: The method of any of clauses 149-154, wherein preventing the virtual camera from passing through the at least one virtual solid object comprises preventing the virtual camera from moving along virtual paths that exceed permissible paths defined in the MPEG_camera_control extension.

Clause 156: The method of any of clauses 145-155, wherein the camera control data is included in an MPEG_mesh_collision extension.

Clause 157: The method of clause 156, wherein the MPEG_mesh_collision extension includes data defining at least one 3D mesh for the at least one virtual solid object.

Clause 158: The method of clause 157, wherein the MPEG_mesh_collision extension includes data defining at least one of boundaries of the 3D mesh, a material for the 3D mesh, or animations to be presented in response to the virtual camera contacting the 3D mesh.

Clause 159: The method of any of clauses 156-158, wherein the MPEG_mesh_collision extension conforms to Table 2 above.

Clause 160: The method of any of clauses 156-159, wherein preventing the virtual camera from passing through the at least one virtual solid object comprises preventing the virtual camera from entering the at least one virtual solid object using the MPEG_mesh_collision extension.

Clause 161: A device for retrieving media data, the device comprising one or more means for performing the method of any of clauses 145-160.

Clause 162: The device of clause 161, wherein the one or more means comprise one or more processors implemented in circuitry.

Clause 163: The device of clause 161, wherein the apparatus comprises at least one of: an integrated circuit; a microprocessor; and a wireless communication device.

Clause 164: A device for retrieving media data, the device comprising: means for receiving streamed media data representing a virtual three-dimensional scene including at least one virtual solid object; means for receiving camera control data for the three-dimensional scene, the camera control data including data defining restrictions to prevent a virtual camera from passing through the at least one virtual solid object; means for receiving camera movement data from a user requesting that the virtual camera move through the at least one virtual solid object; and means for using the camera control data to prevent the virtual camera from passing through the at least one virtual solid object in response to the camera movement data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   receiving, by a presentation engine, streamed media data representing a virtual three-dimensional (3D) scene;
   receiving, by the presentation engine, an extension data structure associated with the virtual 3-D scene, the extension data structure including:
      first object information comprising a vertex coordinate indicative of at least one virtual cuboid object in the virtual 3D scene, and
      animation information indicative of an animation triggered based on interaction of a virtual camera with the at least one virtual cuboid object in the virtual 3D scene;
   receiving, by the presentation engine, camera movement data from a user requesting that the virtual camera move through the at least one virtual cuboid object; and
   using the first object information, updating, by the presentation engine, a location of the virtual camera to ensure the virtual camera remains outside of the at least one virtual cuboid object in response to the camera movement data.

2. The method of claim 1, wherein updating the location of the virtual camera comprises preventing the virtual camera from passing through the at least virtual cuboid object.

3. The method of claim 1, wherein receiving the extension data structure comprises receiving an MPEG_extension.

4. The method of claim 3, wherein the MPEG_extension further includes data defining at least one 3D mesh for the at least one virtual cuboid object.

5. The method of claim 4, wherein the MPEG_extension includes data defining at least one of boundaries of the at least one 3D mesh for the at least one virtual cuboid object or a material for the 3D mesh.

6. The method of claim 1, wherein receiving the first object information comprises receiving data including one or more of:
   boundaries data representing one or more collision boundaries of the at least one virtual cuboid object;
   static data representing whether the at least one virtual cuboid object is affected by collisions; or
   material data representing how colliding objects interact with the at least one virtual cupid object.

7. The method of claim 1, wherein the at least one virtual cuboid object comprises one of a virtual wall, a virtual chair, or a virtual table.

8. The method of claim 1, wherein the streamed media data comprises glTF 2.0 media data.

9. The method of claim 1, wherein receiving the streamed media data comprises requesting the streamed media data from a retrieval unit via an application programming interface (API).

10. The method of claim 1, wherein the extension data structure is included in an MPEG scene description.

11. A device for retrieving media data, the device comprising:
   a memory configured to store media data; and
   one or more processors implemented in circuitry and configured to execute a presentation engine configured to:
      receive streamed media data representing a virtual three-dimensional OD) scene;
      receive an extension data structure associated with the virtual 3-D scene, the extension data structure including:
         first object information comprising a vertex coordinate indicative of at least one virtual cuboid object in the virtual 3D scene, and
         animation information indicative of an animation to be presented based on interaction of a virtual camera with the at least one virtual cuboid object in the virtual 3D scene;
      receive camera movement data from a user requesting that the virtual camera move through the at least one virtual cuboid object; and
      using the first object information, update a location of the virtual camera to ensure the virtual camera remains outside of the at least one virtual cuboid object in response to the camera movement data.

12. The device of claim 11, wherein to update the location of the virtual camera, the presentation engine is configured to prevent the virtual camera from passing through the at least virtual cuboid object.

13. The device of claim 11, wherein to receive the extension data structure, the presentation engine is configured to receive an MPEG_extension.

14. The device of claim 13, wherein the MPEG_extension further includes data defining at least one 3D mesh for the at least one virtual cuboid object.

15. The device of claim 14, wherein the MPEG_extension includes data defining at least one of boundaries of the at least one 3D mesh for the at least one virtual cuboid object or a material for the 3D mesh.

16. The device of claim 11, wherein to receive the first object information, the presentation engine is configured to receive data including one or more of:
   boundaries data representing one or more collision boundaries of the at least one virtual cuboid object;
   static data representing whether the at least one virtual solid object is affected by collisions; or material data representing how colliding objects interact with the at least one virtual cuboid object.

17. The device of claim 11, wherein the at least one virtual cuboid object comprises one of a virtual wall, a virtual chair, or a virtual table.

18. The device of claim 11, wherein the streamed media data comprises glTF 2.0 media data.

19. The device of claim 11, wherein to receive the streamed media data, the presentation engine is configured to request the streamed media data from a retrieval unit via an application programming interface (API).

20. The device of claim 11, wherein the extension data structure is included in an MPEG scene description.

21. A computer-readable storage medium having stored thereon instructions that, when executed, cause a processor to:
receive streamed media data representing a virtual three-dimensional (3D) scene;
receive an extension data structure associated with the virtual 3-D scene, the extension data structure including:
first object information comprising a vertex coordinate indicative of at least one virtual cuboid object in the virtual 3D scene, and
animation information indicative of an animation triggered based on interaction of a virtual camera with the at least one virtual cuboid object in the virtual 3D scene;
receive camera movement data from a user requesting that the virtual camera move through the at least one virtual cuboid object; and
using the first object information, update a location of the virtual camera to ensure the virtual camera remains outside of the at least one virtual cuboid object in response to the camera movement data.

22. The computer-readable medium of claim 21, wherein the instructions that cause the processor to update the location of the virtual camera comprise instructions that cause the processor to prevent the virtual camera from passing through the at least virtual cuboid object.

23. The computer-readable medium of claim 21, wherein the instructions that cause the processor to receive the extension data structure comprise instructions that cause the processor to receive an MPEG_extension.

24. The computer-readable medium of claim 22, wherein the MPEG_extension further includes data defining at least one 3D mesh for the at least one virtual cuboid object.

25. The computer-readable medium of claim 23, wherein the MPEG_mesh_collision extension includes data defining at least one of boundaries of a 3D mesh for the at least one virtual solid object, a material for the 3D mesh, or animations to be presented in response to the virtual camera contacting the 3D mesh.

26. The computer-readable medium of claim 21, wherein the instructions that cause the processor to receive the first object information comprise instructions that cause the processor to receive data including one or more of:
boundaries data representing one or more collision boundaries of the at least one virtual cuboid object;
static data representing whether the at least one virtual cuboid object is affected by collisions; or
material data representing how colliding objects interact with the at least one virtual cuboid object.

27. The computer-readable medium of claim 21, wherein the at least one virtual cuboid object comprises one of a virtual wall, a virtual chair, or a virtual table.

28. The computer-readable medium of claim 21, wherein the streamed media data comprises glTF 2.0 media data.

29. The computer-readable medium of claim 21, wherein the instructions that cause the processor to receive the streamed media data comprise instructions that cause the processor to request the streamed media data from a retrieval unit via an application programming interface (API).

30. The computer-readable medium of claim 21, wherein the extension data structure is included in an MPEG scene description.

31. A device for retrieving media data, the device comprising:
means for receiving streamed media data representing a virtual three-dimensional (3D) scene;
means for receiving an extension data structure associated with the virtual 3-D scene, the extension data structure including:
first object information comprising a vertex coordinate indicative of at least one virtual cuboid object in the virtual 3D scene, and
animation information indicative of an animation triggered based on interaction of a virtual camera with the at least one virtual cuboid object in the virtual 3D scene;
means for receiving camera movement data from a user requesting that the virtual camera move through the at least one virtual sew cuboid object; and
means for updating a location of the virtual camera to ensure the virtual camera remains outside of the at least one virtual cuboid object in response to the camera movement data using the first object information.

* * * * *